United States Patent
Gage et al.

(10) Patent No.: US 6,407,966 B1
(45) Date of Patent: Jun. 18, 2002

(54) APPARATUS AND METHOD FOR DIFFERENTIAL WAX-WANE FOCUSING AND PUSH-PULL TRACKING FOR MAGNETO-OPTICAL DATA STORAGE

(75) Inventors: Edward C. Gage, Apple Valley; Ronald Evan Gerber, Richfield, both of MN (US)

(73) Assignee: Seagate Technology LLP, Scotts Valley, CA (US)

( * ) Notice: Subject to any disclaimer, the term of this patent is extended or adjusted under 35 U.S.C. 154(b) by 0 days.

(21) Appl. No.: 09/158,040

(22) Filed: Sep. 21, 1998

Related U.S. Application Data

(60) Provisional application No. 60/059,439, filed on Sep. 22, 1997.

(51) Int. Cl.[7] .............................................. G11B 7/09
(52) U.S. Cl. ................................ 369/44.23; 369/44.42
(58) Field of Search ........................... 369/44.23, 112, 369/44.37, 44.38, 44.41, 44.42, 110, 13

(56) References Cited

U.S. PATENT DOCUMENTS

| | | | |
|---|---|---|---|
| 4,888,752 A | | 12/1989 | Arai ............................. 369/44 |
| 4,897,828 A | * | 1/1990 | Yoshitoshi et al. ....... 369/44.23 |
| 4,987,292 A | | 1/1991 | Howard .................... 250/201.5 |
| 5,153,864 A | * | 10/1992 | Ishika ...................... 369/44.23 |
| 5,161,139 A | * | 11/1992 | Inoue et al. ............. 369/44.23 |
| 5,182,444 A | | 1/1993 | Howard .................... 250/201.5 |
| 5,253,236 A | | 10/1993 | Latta et al. ............... 369/44.24 |
| 5,416,755 A | * | 5/1995 | Endo et al. ............... 365/44.38 |
| 5,594,714 A | * | 1/1997 | Lee et al. ................. 369/44.23 |
| 5,629,911 A | * | 5/1997 | Sasaki ...................... 369/44.42 |

FOREIGN PATENT DOCUMENTS

| | | | |
|---|---|---|---|
| JP | 2240849 | * | 9/1990 |
| JP | 3219455 | * | 9/1991 |

OTHER PUBLICATIONS

The International Society for Optical Engineering, "Optical Data Storage '91," ( Feb. 25–27, 1991) vol. 1499, pp. 348–353.

Mark. S. Wang, Tom D. Milster, "Differential wax–wane focus servo," (Sep. 1993) Applied Physics, vol. 32, No. 25, pp. 4797–4807.

Alan B. Marchant, "Optical Recording—A Technical Overview," (1990) Addison–Wesley Publishing Company, 21 pages.

* cited by examiner

Primary Examiner—Thang V. Tran

(57) ABSTRACT

The present invention is an apparatus for generating the focus, tracking, and data signals for a magneto-optical data storage device, using a Wollaston prism and a photodetector having four subdetectors. A reflected beam from a disk is directed into the Wollaston prism and is split into two beams, with the beams oriented substantially parallel to the in-track direction. The beams from the prism are collected asymmetrically by both subdetectors of first and second pairs of subdetectors, so that one subdetector in each pair collects more light than the other, and two diagonally opposite subdetectors receive more light than the other two subdetectors. Two focus composite signals are generated by adding the signals from diagonally opposite subdetectors, and the focus error signal is generated by subtracting one focus composite signal from the other. Two tracking composite signals are generated by adding the signals from adjacent subdetectors such that one subdetector is in the first pair and the other is in the second pair, and the tracking error signal is generated by subtracting one tracking composite signal from the other. Two magneto-optical composite signals are generated by adding the signals from the subdetectors of the first and second pair, respectively, and the magneto-optical data signal is generated by subtracting one magneto-optical composite signal from the other. The reflectivity data signal is generated by adding the signals from both pairs of subdetectors.

19 Claims, 9 Drawing Sheets

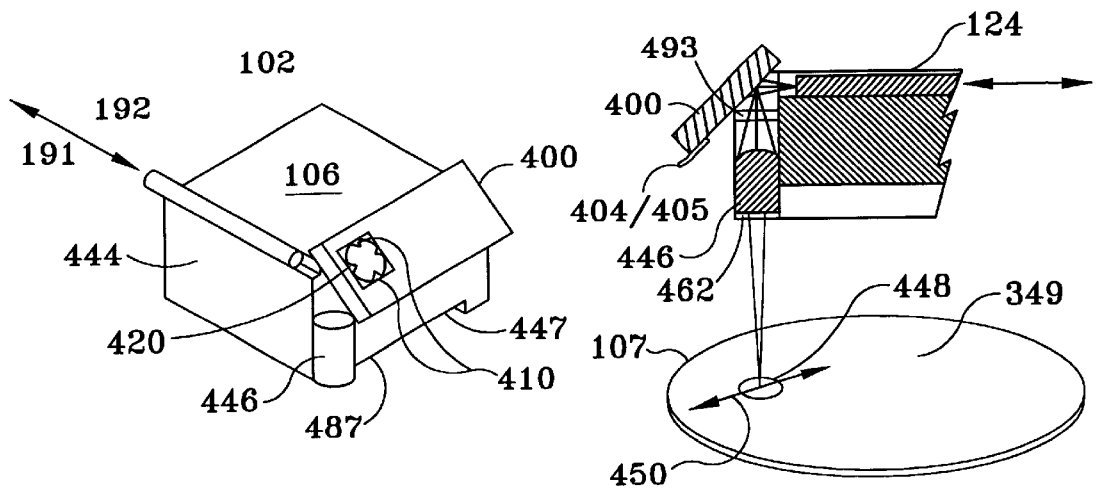
Fig. 4a
Fig. 4b
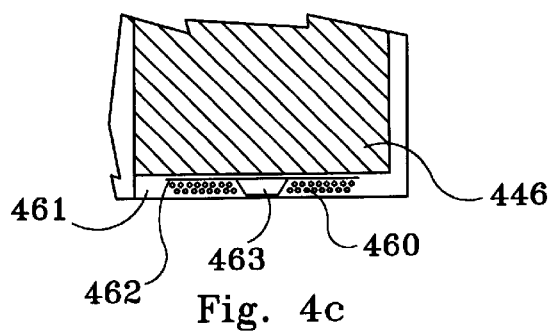
Fig. 4c
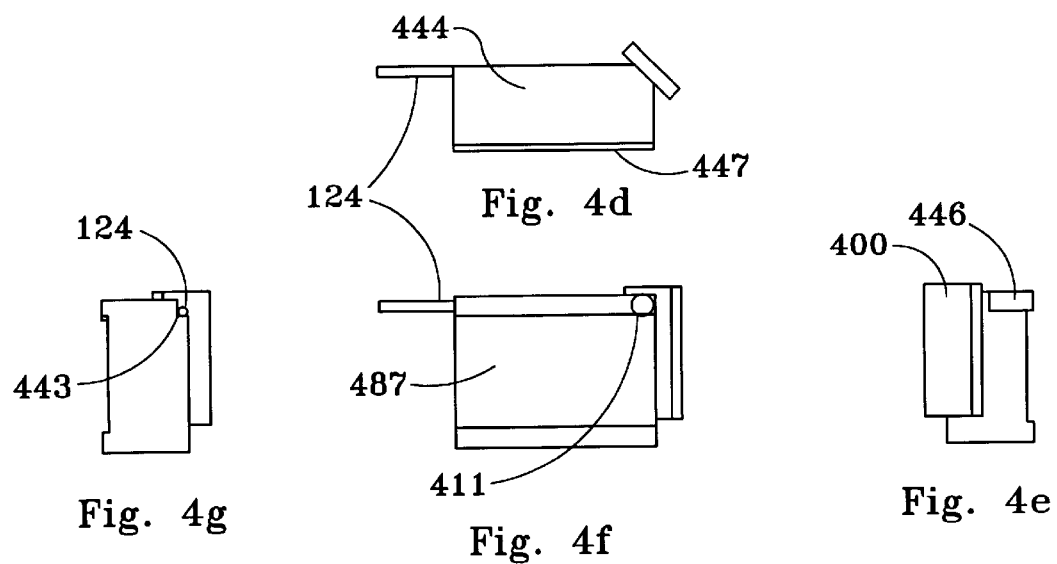
Fig. 4g
Fig. 4d
Fig. 4f
Fig. 4e

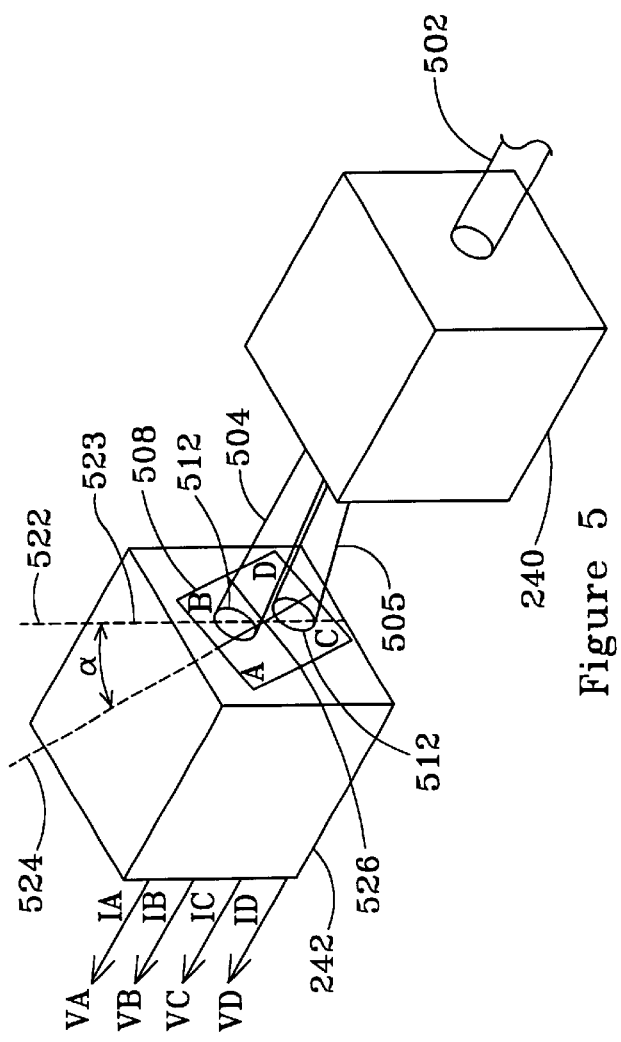
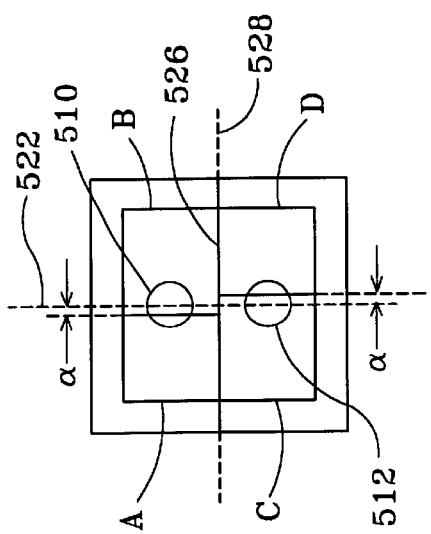
Figure 7
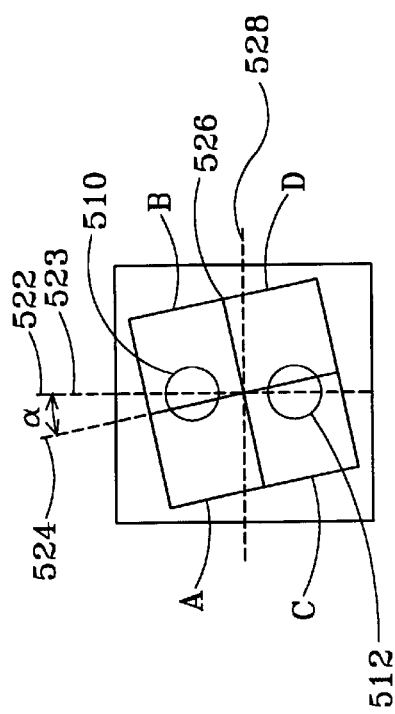
Figure 5
Figure 6

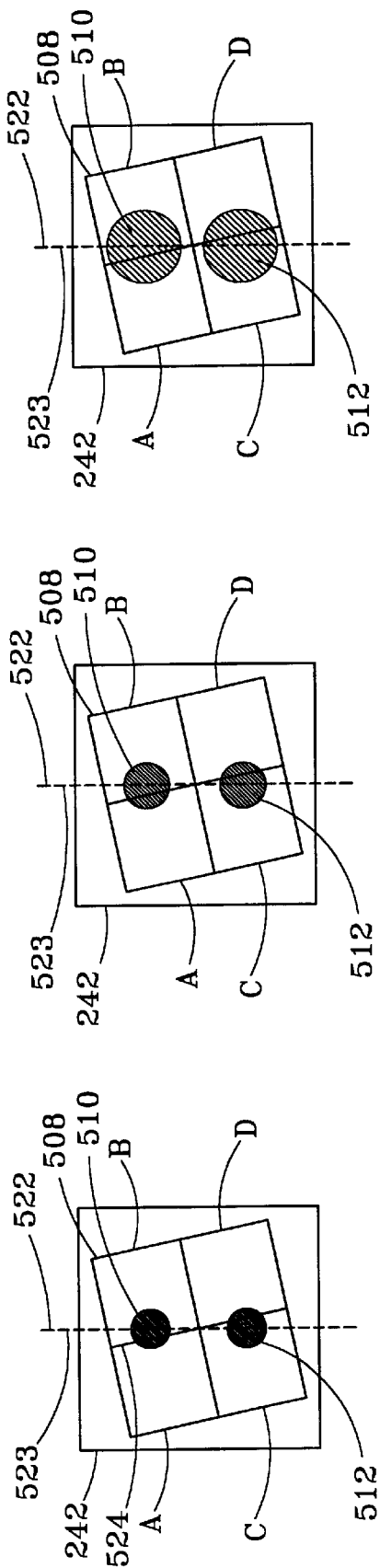

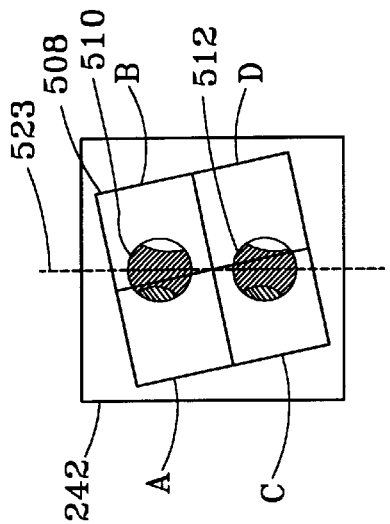
Figure 10C Spot focused on "right" edge of groove
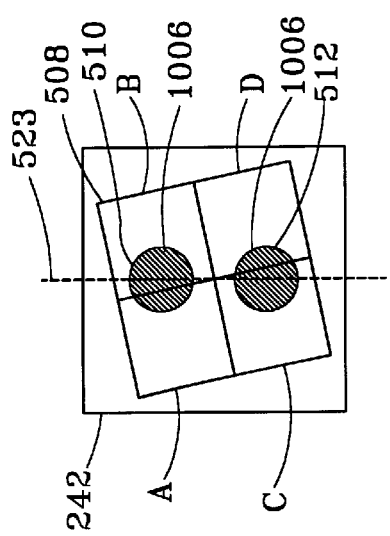
Figure 10B Spot focused on center of groove
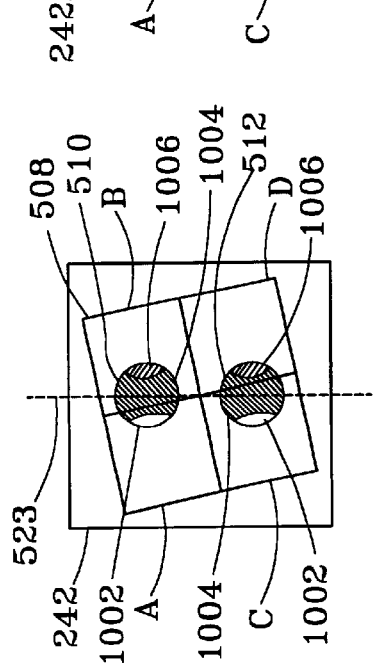
Figure 10A Spot focused on "left" edge of groove
Push-pull tracking

APPARATUS AND METHOD FOR DIFFERENTIAL WAX-WANE FOCUSING AND PUSH-PULL TRACKING FOR MAGNETO-OPTICAL DATA STORAGE

CROSS-REFERENCE TO RELATED APPLICATION

This invention is based on U.S. Provisional Patent Application, Ser. No. 60/059,439, filed Sep. 22, 1997, assigned to the assignee of this application and incorporated herein by reference.

FIELD OF THE INVENTION

The present invention is directed to an improved method and apparatus for determining the focus and tracking of a light beam from a reflective medium, and, in particular, the invention is directed to a method and apparatus for differential wax-wane focusing and push-pull tracking for a magneto-optical data storage device.

BACKGROUND OF THE INVENTION

In an optical disk data storage system, light from a laser diode is focused onto the surface of a rotating optical disk. Data is stored on the disk in a track or tracks. The optical disk may have a single spiral track or multiple concentric tracks. Data storage on rotating media requires position sensing information to be included on a part of the data storage surface so that the data storage systems can retrieve information recorded on that surface. Positioning information is typically encoded on the disk surface in a series of pits and grooves. As the disk rotates, the light from the laser diode should be focused in the plane of the disk and on the track centerline. A focusing servo system generates a focus error signal that controls the positioning of the laser diode with respect to the disk surface. A tracking servo system generates a tracking error signal that controls the positioning of the laser diode with respect to the track centerline. The focus error signal and a track error signal control actuators that are coupled to the laser diode to properly focus and align the laser diode with respect to a desired track. The focus and tracking error signals are typically generated by combining the electrical signals from a series of photodetectors that capture the light reflected off the optical disk surface. In addition, a reflectivity data signal which has clock and positioning information, and magneto-optical (MO) data signal which represents the encoded data are generated. Typical magneto-optical systems use up to twelve detector elements to generate the four required signals: the focus error signal (FES), the tracking error signal (TES), the reflectivity data signal (RDS) and the magneto-optical data signal (MODS). Other designs place additional optical elements, such as astigmatic lenses or diffraction gratings, in the light path to generate the four signals.

Therefore, it is desirable that a simpler method and apparatus generate the focus error signal, tracking error signal, the reflectivity data signal and the magneto-optical data signal.

SUMMARY OF THE INVENTION

It is therefore a primary object of the invention to provide a less complex apparatus and method for generating the focus error signal.

It is a related objective to provide a less complex apparatus and method for generating the tracking error signal.

It is also an object of the invention to generate the reflectivity data signal and the magneto-optical data signal using the less complex apparatus and method.

The present invention includes an apparatus for determining the focus of a light beam from a reflective medium. The apparatus has a prism and a photodetector. The prism receives the light beam and outputs optical beams. The photodetector has subdetectors. Two adjacent subdetectors form a first pair, the other two adjacent subdetectors form a second pair. The prism projects the optical beams onto the photodetector such that one of the optical beams is projected on at least one subdetector of the first pair of the subdetectors, and another of the optical beams is projected on at least one subdetector of the second pair of the subdetectors. The amount of light projected on the subdetectors indicates the focus of the light beam with respect to the reflective medium.

In another embodiment, one of subdetectors of each pair receives more light than the other subdetector of that pair when in focus.

In yet another embodiment, a disk drive includes the apparatus of the present invention that determines the focus of a light beam from a reflective medium.

In addition, a method for generating a focus error signal is provided. A light beam is received from a reflective medium and first and second light beams are generated from the received beam. The first light beam is projected onto a first pair of subdetectors in a photodetector; and the second light beam is projected onto a second pair of subdetectors in the photodetector. Each subdetector generates a signal in response to the portion of the light beam projected on that subdetector. Two composite signals are determined by adding the signals from diagonally opposite subdetectors in the photodetector. The focus error signal is generated by subtracting one composite signal from the other.

Other features and advantages of the present invention will become apparent to a person of skill in the art who studies the following invention disclosure given with respect to the following disclosure.

BRIEF DESCRIPTION OF THE DRAWINGS

The present invention can be better understood by reference to and review of the following drawings:

FIGS. 4A–4G are views from various angles and with varying degrees of detail of a slider and the optics supported on the slider in a magneto-optical disc drive;

FIG. 5 is a diagrammatic side view of the Wollaston prism and the photodetector of the present invention;

FIG. 6 is a front view of the photodetector of FIG. 5;

FIG. 7 is a front view of another embodiment of the photodetector of FIG. 5;

FIG. 8A illustrates the out of focus condition when the magneto-optical head is too far from the disk surface;

FIG. 8B illustrates the in-focus condition when the head magneto-optical head is properly positioned with respect to the disk surface;

FIGS. 8C illustrates the out of focus condition when the magneto-optical head is too close to the disk surface;

FIG. 10A illustrates the received beams or spots on the photodetector for an off track condition when the head is positioned too close to a left edge of track or groove;

FIG. 10B illustrates the received beams or spots on the photodetector for an on-track position when the head is properly positioned over the track centerline;

FIG. 10C illustrates the received beams or spots on the photodetector for an off track condition in which the head too close to the right edge of the track or groove.

DETAILED DESCRIPTION OF THE PREFERRED EMBODIMENTS

The present invention is an apparatus and method for providing a focus error signal (FES) and a tracking error signal (TES) in a magneto-optical storage system. Therefore a brief description of the basic elements of the magneto-optical storage system will be provided. Since the necessary servo information is a series of pits formed on or readable through the disk surface and requires an optical reader, a brief description of the basic elements of an optical reading system is also included.

Figure 1:
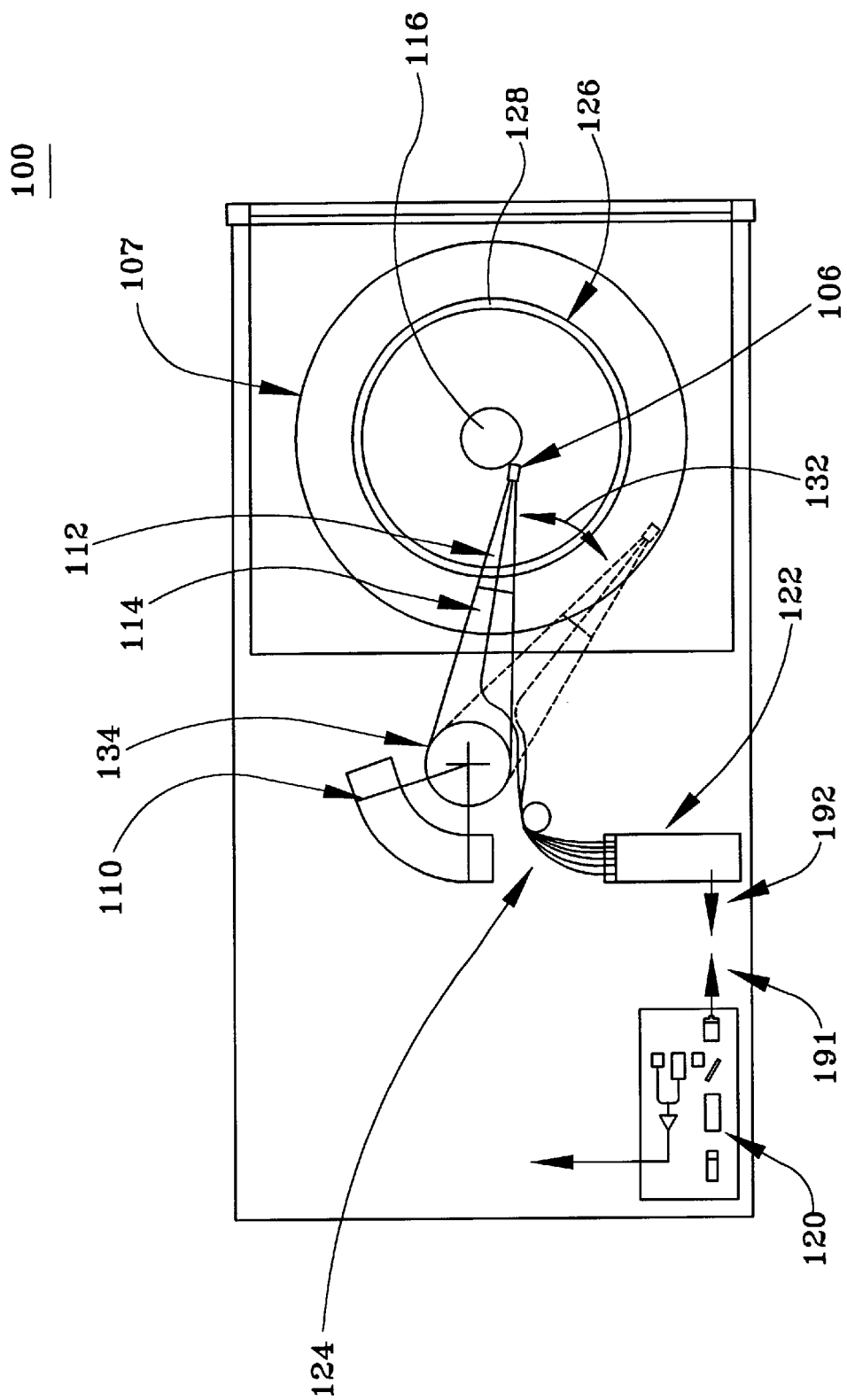
FIG. 1 is a top plan view of the basic elements of a magneto-optical disc drive.

Referring now to the drawings, FIG. 1 is a plan view illustrating some of the basic elements of a magneto-optical (MO) data storage and retrieval system. Few specific details are identified in this and FIGS. 2 through 4 as they are intended to portray some of the basic elements of a functional system in which the present invention is useful. The invention is not limited to use in only one specific MO data storage system.

In FIG. 1, the system 100 includes a set of flying heads 106, whose details will be described below, that are adapted for use with MO discs 107. In the example, the disks 107 are double sided. One flying head 106 is provided for each MO disk surface 107. The heads 106 are coupled to a rotary actuator magnet and coil assembly 110 by a suspension 112 and actuator arm 114 to be positioned over the surfaces of the MO discs 107. In operation, the MO discs 107 are rotated by a spindle motor 116 to generate aerodynamic lift forces between the flying heads 106 and the rotating disc 107. This maintains each flying MO head 106 in a flying condition above the data recording surface of each MO disc 107. The lift forces are opposed by equal and opposite spring forces supplied by the suspensions 112. During non-operation, each flying MO head 106 is maintained statically in a storage condition away from the surface of the MO disc 107, typically on a ramp (not shown) adjacent to the disk surface 107. It is of course possible that the heads could be landed on the surface of the disc in a non-data storage region; however, such an approach would not be the optimum approach.

System 100 further includes a laser-optics assembly 120 coupled to an optical switch 122 which connects to a set of single mode polarization maintaining (PM) optical fibers 124. The laser optics assembly 120 can be coupled with optically with beams 191, 192 or with single mode PM optical fiber. In the exemplary embodiment, each set of single mode PM optical fibers 124 are coupled through a respective one of the set of actuator arms 114 and suspensions 112 to a respective one of the set of flying MO heads 106.

Figure 2:
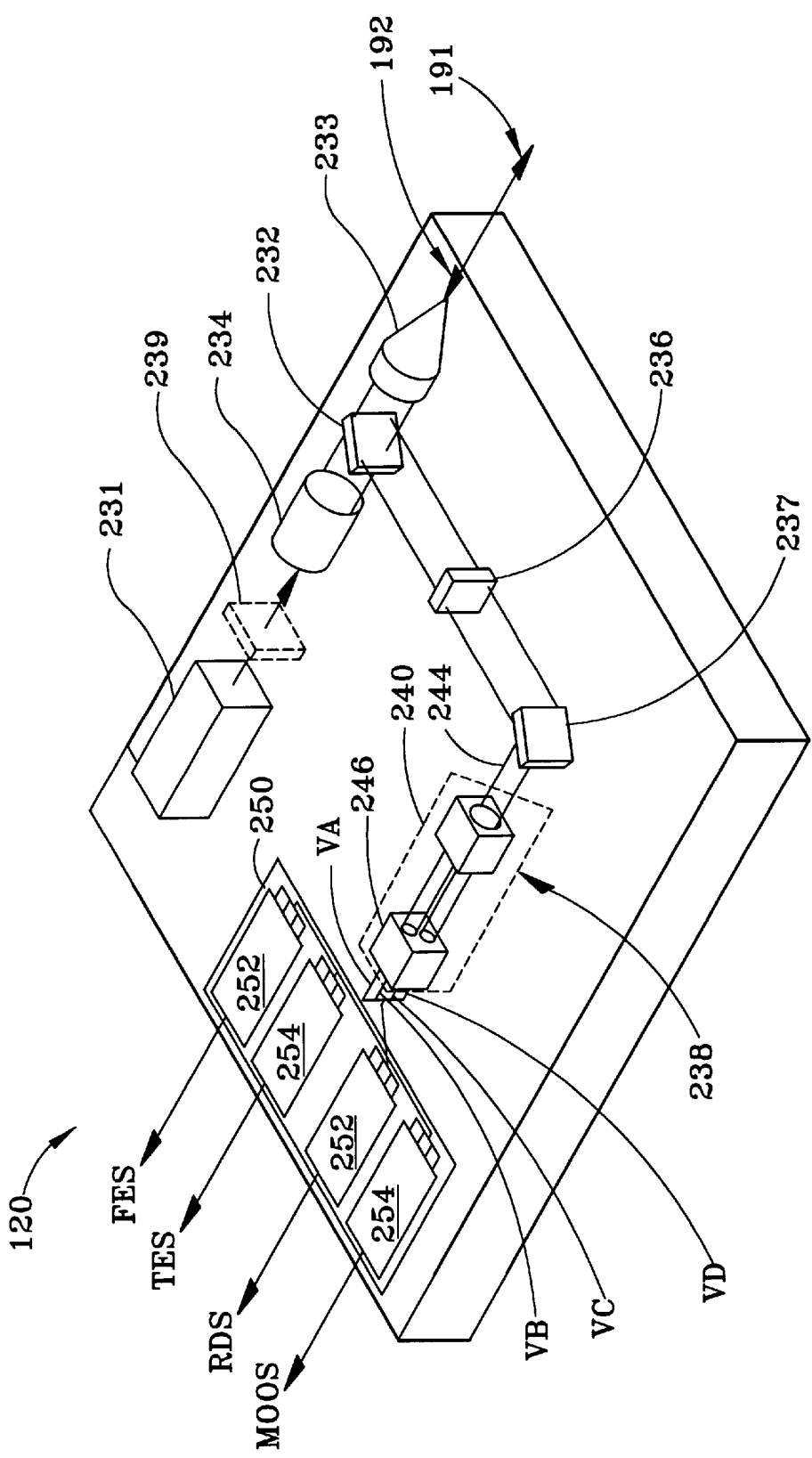
FIG. 2 illustrates the primary optical paths and some basic electrical elements of a magneto-optical disc drive in which this invention is useful.

FIG. 2 is a diagram showing the laser-optics assembly 120 of the magneto-optical data storage and retrieval system of FIG. 1. As will now be explained with respect to FIGS. 2 and 3, reading and storing information on the surface of each disc 107 requires both conveying the output of a laser through an optical fiber to the flying head so that the light output is accurately imaged on the surface of the disc, and generating a magnetic field utilizing a coil which is supported on the flying head 106 near to the surface of the disc 107.

Referring also to FIG. 1, typically the data is arranged in a concentric series of tracks 126, with each track being made up of a number of sectors which in turn contain multiple bits of binary data. The servo information is typically recorded in the space 128 between these tracks; typically the information is embossed on the surface of the disc or otherwise formed as a series of pits and grooves in the data recording surface. In forming a magnetic storage system disc, the pits and grooves for each track 126 of servo data could be created as part of the forming or molding process which is used to form the disc. The type of materials of which such magnetic storage discs are currently formed have been well identified and described in a number of published documents, and need not be further described herein. The data would be both written and read on the data tracks 126 which would be found between the servo track regions 128 by the MO head 106 supported on an actuator 114 for radial movement in the direction of arrow 132. The movement is caused by a motor generally indicated at 110 which causes rotation of the actuator 110 about an actuator bearing and pivot 134.

Figure 3:
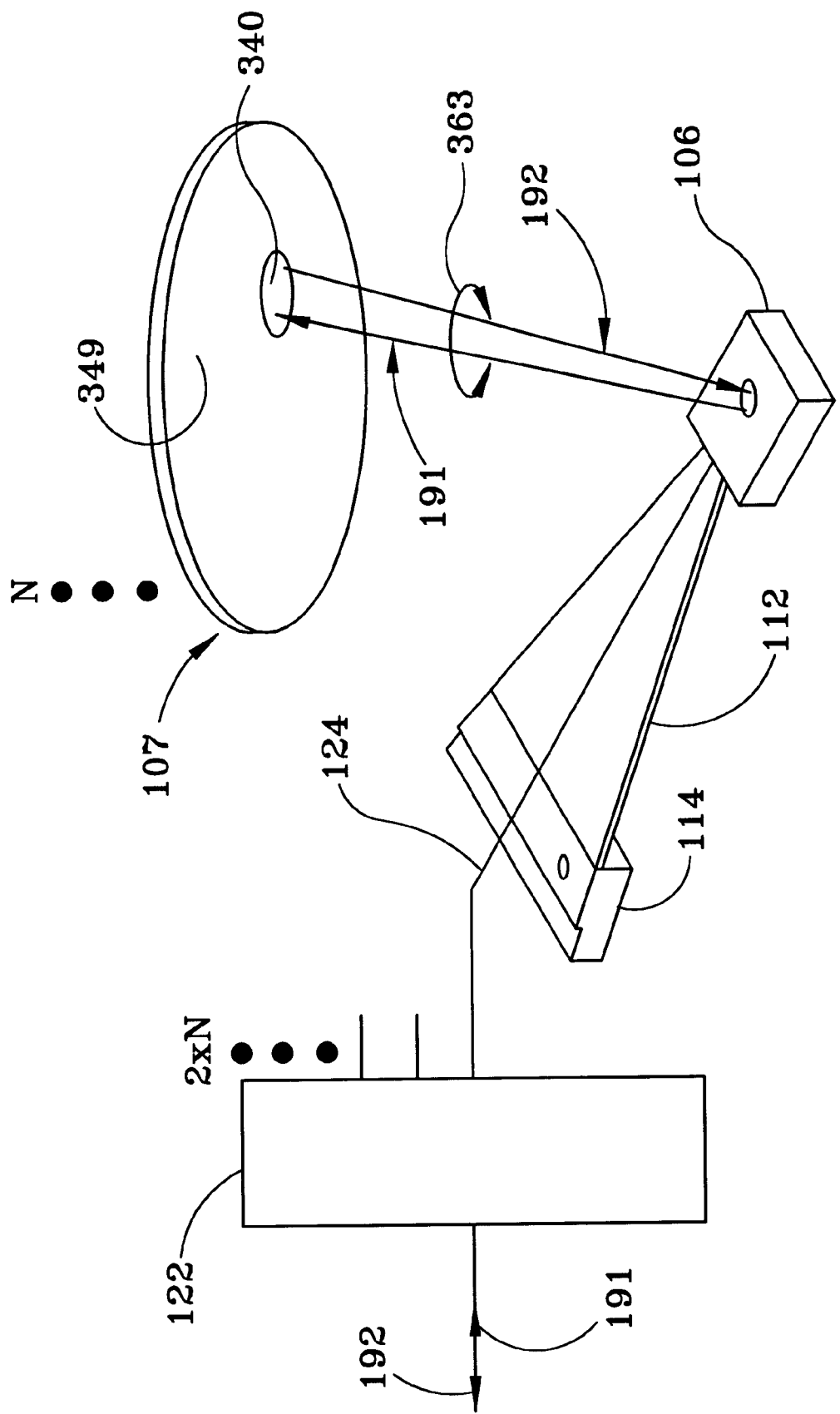
FIG. 3 is a schematic view showing the actuator arm, slider and disc of a magneto-optical disc drive.

The description of FIGS. 2 and 3 will briefly summarize the reasons for providing both a light source and a magnetic field to selectively access the data on the surface of the disc 107. In FIG. 2, the laser-optics assembly 120 is shown to include a linearly polarized diode laser source 231 operating in a visible or near ultraviolet frequency region and emitting an optical power sufficient for reading and writing using the set of MO discs 107. In a first embodiment, the laser diode source may be a RF modulated laser source. In a second embodiment, the linearly polarized laser source 231 may be a distributed feedback (DFB) laser source. In an exemplary embodiment, the linearly polarized laser source 231 is selected to operate within a range of 635–685 nm; however, a laser source of other wavelengths could also be used. The laser-optics assembly 120 further includes: a collimating optics 234, a low wavelength dispersion leaky beam splitter 232 and a coupling lens 233. The laser-optics assembly 120 directs (from the linearly polarized laser source 231) a linearly polarized outgoing laser beam (shown in FIG. 1) to the optical switch 122. The laser-optics assembly 120 further includes a ¼ wave plate 236 and a mirror 237. In the first embodiment, a linearly polarized reflected laser beam 192 (shown in FIG. 1) is directed by the optical switch 122 to the coupling lens 233, and is routed by the leaky beam splitter 232 to the ¼ wave plate 236 and mirror 237. The light is reflected off the mirror 237 into a differential detector 238. In the second embodiment, an optical isolator 239 is included between the laser source 231 and the collimating lens 234. In an alternate embodiment, the ¼ wave plate 236 and mirror 237 are not used, and the light beam is routed directly to the Wollaston prism 240 from the beam splitter 232.

In a noteworthy aspect of the invention, in both embodiments, the differential detector 238 includes a Wollaston prism 240 that is placed between the mirror 237 and a photodetector 242. The Wollaston prism 240 receives the incoming light beam 244 and projects two optical beams onto the photodetector 242. In a preferred embodiment, the photodetector 242 has four subdetectors arranged to receive the optical beams. In response to the portion of the optical beam projected upon the subdetector, each subdetector generates a voltage $V_A, V_B, V_C, V_D$, and a current $I_A, I_B, I_C, I_D$, respectively, which are output to summing block 250. The arrangement of the subdetectors A,B,C,D and the orientation of the optical beams from Wollaston prism with respect to the subdetectors A,B,C,D affects the generated voltage $V_A, V_B, V_C, V_D$.

Inside the summing block 250, an FES generator 252 generates the FES signal using the following relationship: $(V_B+V_C)-(V_A+V_D)$. A TES generator 254 generates the TES signal using the following relationship: $(V_A+V_C)-(V_B+V_D)$. The Reflectivity data signal (RDS) is used for clocking and tracking and is generated by an RDS generator 256 as follows: $V_A+V_B+V_C+V_D$. The Magneto-optical data signal (MODS) represents the stored data and is generated as follows: $(V_A+V_B)-(V_C+V_D)$. Note that each of the four signals $V_A, V_B, V_C, V_D$ generated by the photodetector 242 is supplied to each of the generators 252–258. As is well-established in the art, summing amplifiers and subtractors are used to implement the relationships above to generate the FES, TES, RDS and MODS in the respective generator 252–258.

With respect to the reflectivity data signal, the sum of the signals from the subdetectors produces a signal whose amplitude is proportional to the amount of light reflected from the disk. Reflectivity variations of the disk can be caused by pits in the disk that cause a loss of return light due to destructive interference. The reflectivity variations can also be caused by differences in material properties that fill the pits. Reflectivity information is used for encoding position information on the disk.

FIG. 3 is a diagram showing a representative optical path that includes the use of a DFB laser source. In a preferred embodiment, a representative optical path is shown in FIG. 3 to include, the optical switch 122, one of the set of single-mode PM optical fibers 124, and one of the set of flying MO heads 106. The optical switch 122 provides sufficient degrees of selectivity for directing the outgoing laser beam 191 (with reference to laser source 231) to enter a respective proximal end of a respective single-mode PM optical fiber 124. The outgoing laser beam 191 is further directed by the single mode PM optical fiber 124 to exit a respective distal end so as to pass through the flying MO head 106 onto a recording/storage layer 349 of a respective MO disk 107.

In the preferred embodiment, the outgoing laser beam 191 is provided by a linearly polarized laser source 231 that is a DFB laser source. A DFB diode laser source, unlike an RF-modulated Fabry-Perot diode laser, produces a very narrowband single-frequency output due to the use of a wavelength selective grating element inside the laser cavity. When linearly polarized light from a laser source 231 that is a DFB laser source is launched into a single-mode PM optical fiber 124, the light exiting the optical fiber includes a polarization state that depends on the relative orientation between the fiber axes and the incident polarization, and moreover, the output polarization state is very stable in time as long as external perturbations which alter the fiber birefringence are negligible. The DFB laser source enables use of the single-mode PM optical fiber 124 for delivery and return of polarized laser light to and from the MO disk 107.

During writing of information, the outgoing laser beam 191 is selectively routed by the optical switch 122 to the MO disk 107 so as to lower a coercivity of the recording/storage layer 249 by heating a selected spot of interest 350 to approximately the Curie point of the recording/storage layer 349. Preferably, the optical intensity of outgoing laser beam 191 is held constant, while a time varying vertical bias magnetic field is used to define a pattern of "up" or "down" magnetic domains perpendicular to the MO disk 107. This technique is known as magnetic field modulation (MFM). Alternatively, outgoing laser beam 191 may be modulated in synchronization with the time varying vertical bias magnetic field at the spot of interest 340 in order to better control domain wall locations and reduce domain edge jitter. Subsequently, as the selected spot of interest 340 cools, information is encoded within the recording/storage layer 249 of the respective rotating disk.

During readout of information, the outgoing laser beam 191 (at a lower intensity compared to writing) is selectively routed to the MO disk 107 such that at any given spot of interest 340, the Kerr effect causes (upon reflection of the outgoing laser beam 191 from the recording/storage layer 349) a reflected laser beam 192 to have a rotated polarization of either clockwise or counter clockwise sense 363 that depends on the magnetic domain polarity at the spot of interest 340.

The aforementioned optical path is bi-directional in nature. Accordingly, the reflected laser beam 192 is received through the flying MO head 106 and enters the distal end of the single-mode PM optical fiber 124. The reflected laser beam 192 propagates along the single-mode PM optical fiber 124 to exit at its proximal end and is selectively routed by the optical switch 122 for transmission to laser-optics assembly 120 for subsequent input to the summing block to generate the FES, TES, RDS, and MODS.

FIGS. 4A–4F are diagrams showing the flying magneto-optical head of the magneto-optical data storage unit in a perspective, a side cross-sectional, an expanded cross-section, a side, a front, a bottom, and a rear view, respectively. In FIG. 4A, the flying MO head 106 is shown for use above a recording/storage layer 349 of one of the set of MO discs 107. The flying MO head 106 includes: a slider body 444, an air bearing surface 447, a quarter-wave plate 493, a reflective substrate 400, objective optics 446, a magnetic coil 460, and a yoke 462. The slider body 444 is dimensioned to accommodate the working distances between the objective optics 446, the single-mode PM optical fiber 124 and the reflective substrate 400. The reflective substrate 400 may include a reflective surface which is aligned so as to direct the outgoing laser beam 191 and 192 to and from the recording/storage layer 349. Although slider body 444 may include industry standard "mini", "micro", "nano" or "pico" sliders, alternatively dimensioned slider bodies 444 may also be used. In the preferred embodiment, the slider body 444 comprises a mini-slider height (889 $\mu$m) and a planar footprint area corresponding to that of a nano-slider (1,600× 2,032 $\mu$m).

The single-mode PM optical fiber 124 is coupled to the slider body 444 along an axial cutout 443, and the objective optics 446 is coupled to the slider body 444 along a vertical corner cutout 411. Preferably, the cutouts 443 and 411 may be designed as channels, v-grooves, or any other suitable means for coupling and aligning the single-mode optical fiber 124 and objective optics 446 to the flying MO head 106. In this embodiment, the laser beams 191 and 192 traverse an optical path (to and from the recording/storage layer 349 of the MO disk 107) that includes: the single-mode PM optical fiber 124, the reflective substrate 400, the quarter-wave plate 493, and the objective optics 446. In this embodiment, the single-mode PM optical fiber 124 and the objective optics 446 are positioned within their respective cutouts to achieve focus of the outgoing laser beam 191 within the spot of interest 350 (See FIG. 3) as a focused optical spot 448. The single-mode optical fiber 124 and the objective optics 446 may be subsequently secured in place by using ultraviolet curing epoxy or a similar adhesive.

Referring now to FIG. 5, in a noteworthy aspect of the invention, the Wollaston prism 240 receives a light beam 502 reflected from the disk. The Wollaston prism 240 outputs or generates two optical beams 504, 506 from the light beam 502. The Wollaston prism 240 is arranged to project the two optical beams 504, 506 onto a sensor surface 508 of the photodetector 242 as shown by spots 510, 512. The sensor surface 508 includes subdetectors A,B,C, and D. The subdetectors A,B,C,D are photo-diodes. Subdetectors A and B form a first pair, and subdetectors C and D form a second pair. The Wollaston prism 240 projects the optical beams 504, 506 onto the photodetector 242 such that one of the optical beams is projected on at least one subdetector of the first pair of subdetectors, and another of the optical beams is projected on at least one subdetector of the second pair. The amount of light projected on the subdetectors indicates the focus of the light beam with respect to the reflective medium.

In particular, in response to the amount of light projected on that subdetector, each subdetector A,B,C,D generates a voltage which is output on wires as $V_A, V_B, V_C, V_D$, to the summing block, which was described above, to generate the FES, TES, RDS and MODS signals.

A significant feature of the invention is that one of the subdetector of the first and second pairs of subdetectors receives more light than the other subdetector of that pair when the light beam from the head is properly focused on the reflective medium. As shown in FIG. 5, subdetector B receives more light than subdetector A, and subdetector C receives more light than subdetector D. The spot 510 covers a larger portion of the surface area of subdetector B than subdetector A, and the spot 512 covers a larger portion of the surface area of subdetector C than D. In other words, one of the optical beams 504 is projected asymmetrically onto the subdetectors A,B of the first pair of subdetectors, and the other optical beam 506 is projected asymmetrically onto the subdetectors C, D of the second pair of subdetectors when the light beam is properly focused over the reflective medium.

In a preferred embodiment, all subdetectors receive a portion of the light from their respective optical beams.

The two optical beams 504, 506 output by the Wollaston 240 prism are both deviated, and the distance between the optical beams 504, 506 increases as the distance from the Wollaston prism 240 increases. The distance from the Wollaston prism 240 to the photodetector 242 is predetermined and is a function of the frequency of the laser light, the intensity of the laser light, and the size and arrangement of the subdetectors A,B,C,D of the photodetector 242.

In an alternate embodiment, other types of prisms that separate the light beam into two optical beams according to the polarization state of the received light beam are used. In another embodiment, a Rochon prism is used.

In FIG. 5, the orientation of the subdetectors A,B,C, and D with respect to the spots 508, 510 from the optical beams 504, 506 is another noteworthy feature of the invention. In one embodiment, the two optical beams 504, 506 are projected onto the subdetecters A,B,C,D to indicate that the head is properly positioned over a track centerline. A beam axis 522 is drawn through the center of each optical beam 504, 506 and is aligned with an on-track axis 523. As shown in FIGS. 5 and 6, the beam axis 522 is aligned with the on-track axis 523 to indicate that the head is properly positioned with respect to a track centerline. The subdetectors A,B,C,D are arranged on the sensor surface 508 in a quadrant which has a vertical axis 524 and a horizontal axis 526. The vertical axis 524 is rotated with respect to the on-track axis 523 by an angle α. In one embodiment α ranges from approximately 5° to 10° and preferably is approximately 7°. If the beam axis 522 is not aligned with the on-track axis 523, then the prism is not properly positioned in the detection system. In FIG. 6, a cross-track axis 528 is substantially perpendicular to the in-track axis 524.

Significantly, the rotation of the vertical axis 524 with respect to the in-track axis 523 causes the FES to have a positive predetermined value or range of values when in focus, and will not be equal to zero. In contrast, the TES will be substantially equal to zero when on the track centerline.

Although FIGS. 5–7 show circular spots 510, 512, in an alternate embodiment, the spots 510, 512 may be elliptical.

In FIG. 5, the sensor surface 508 is rotated with respect to the in-track axis of the Wollaston prism. In an alternate embodiment, the vertical axis 524 and horizontal axis 526 of the sensor surface 508 are aligned to the edges of the photodetector 242, while the Wollaston prism 240 is rotated by the angle α with respect to the vertical axis 524 thereby causing the on-track axis 523 to be rotated by the angle α with respect to the vertical axis 524 of the subdetectors.

Significantly, this dual beam configuration of the photodetector 242 with respect to the Wollaston prism 240 allows the MO data signal to be generated from the voltages output by the photodetector 242 using the equation described above.

FIG. 7 depicts another embodiment of a photodetector of of the present invention. In this embodiment, the horizontal axis 526 of the four subdetectors A,B,C,D is substantially perpendicular to the on track axis 522. Subdetectors A,B form a first pair. Subdetectors C, D form a second pair. The first pair A,B is arranged above the horizontal axis 526, and the second pair C,D is below the horizontal axis 526. The subdetectors of the subdetector pairs are not divided along the on-track axis 522. The subdetectors are arranged such that regions B and C, diagonally opposite each other, are offset and extend over the on-track axis 522 for a predetermined distance d. Significantly, this offset causes the FES to have a positive predetermined value or range of values when in focus, and will not be equal to zero. The TES will be substantially equal to zero when on the track centerline. The amount of offset or predetermined distance d is the same for subdetectors B and C. The amount of offset is such that over 50% but less than 100%, and in particular from over 55% to 95%, and preferably 75% of the optical beams 504, 506 are projected on regions B and D when the head is aligned with the track centerline.

Significantly, the dual beam configuration of the photodetector 242 of FIG. 7 with respect to the Wollaston prism 240 allows the MO data signal to be generated from the voltages output by the photodetector 242 using the equation described above.

FIGS. 8A, 8B and 8C depict the state of the spots 510, 512 for the near side of focus when the MO head is too far from the disk, the proper or best focus, and the far side of focus when the MO head is too close to the disk, respectively. As the optical disk moves away from the best focus position, the spots 510, 512 on the subdetectors A, B, C, D either grow or shrink with respect to the best focus. In FIG. 8B, when properly focused and the FES is generated by applying the relationship, $(V_B+V_C)-(V_A+V_D)$, $V_B+V_C$ will exceed $V_A+V_D$ and the FES will have a positive value. However, FIG. 8A will generate an FES that is positive but the value of the FES will be less than that of FIG. 8B. In contrast, FIG. 8C will generate an FES with a value that exceeds the FES value of FIG. 8B.

Figure 9:
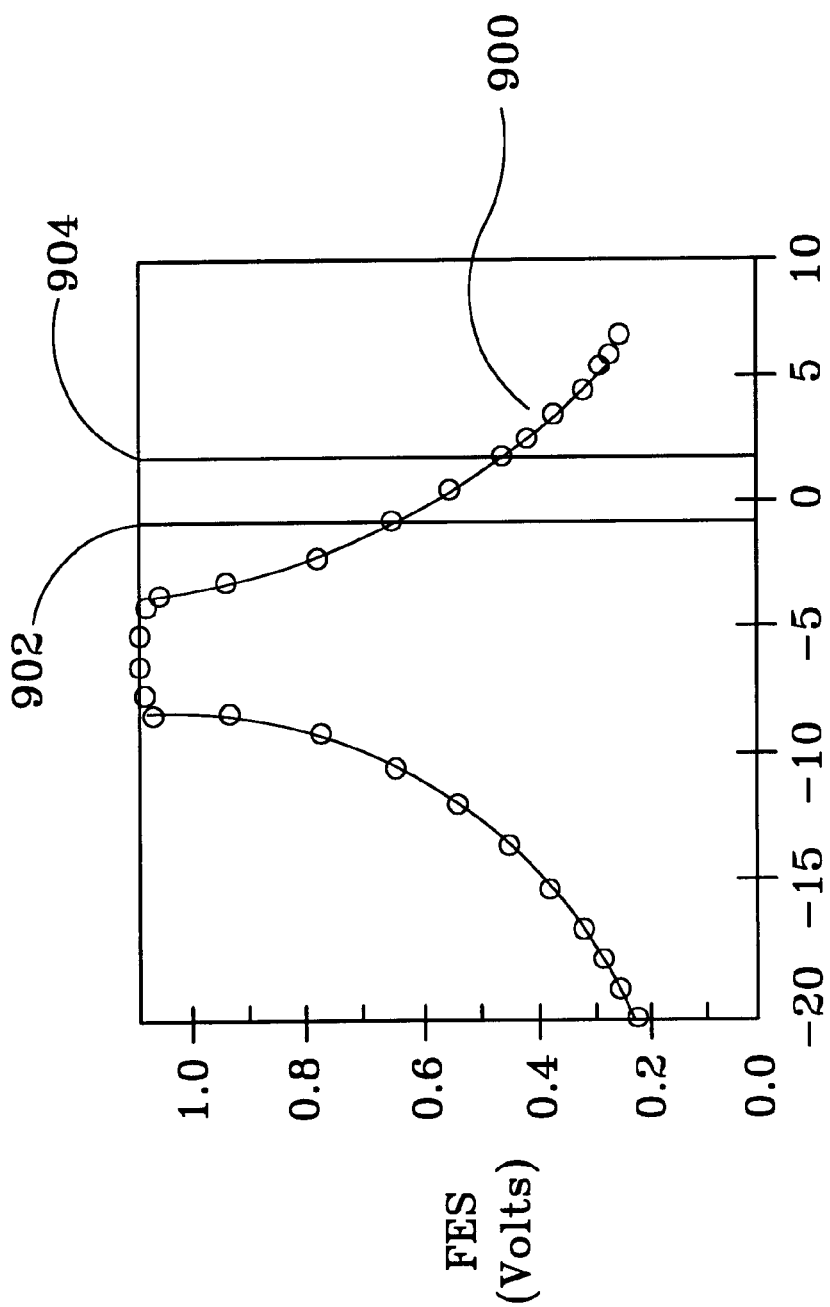
FIG. 9 is a graph of the FES signal versus the distance from an in-focus position of the magneto-optical head with respect to the disk surface.

In FIG. 9, an exemplary FES curve 900 showing the preferred range of operation is shown. The x-axis represents the disk defocus in microns where the disk defocus is the distance from a predetermined position with respect to the disk surface. The y-axis represents the FES in volts. Preferably, the FES value is equal to approximately 0.48 volts when the light beam from the head is properly focused on the disk surface. The slope of the FES curve 900 at the preferred focus value is equal to approximately −0.076 volts/μm. The normal operating range is between lines 902 and 904 and is plus or minus one micron. Although the y-axis of the graph represents volts, other units such as current (amperes) could be used.

FIGS. 10A, 10B, and 10C depict the received beams or spots 510, 512 on the photodetector 242 from the Wollaston prism for an off track, on track and another off track condition, respectively. In FIG. 10A, the head is positioned to the "left" edge of the groove or track. The spots 510, 512 have a bright area 1002, a gray area 1004 and a dark area 1006. The bright area 1002 represents a region of least light intensity; the gray area represents a region of more light intensity than the bright area; and, the dark area 1006 represents a region of the greatest light intensity. Applying the TES equation to the spots 510, 512 of FIG. 10A results in $V_A+V_C$ being greater than $V_B+V_D$, and the TES has a positive value.

In FIG. 10B, the head is properly positioned over the track and each spot 510, 512 is grey 1006. Applying the TES equation to the spots 510, 512 of FIG. 10B results in $V_A+V_C$ being equal to $V_B+V_D$, and the TES is equal to zero.

As the head drifts offtrack in the opposite direction of FIG. 10A, the spots 510, 512 of FIG. 10C have a pattern similar to that shown in FIG. 10A, but reversed. Applying the TES equation to the spots of FIG. 10C results in $V_A+V_C$ being less than $V_B+V_D$, and the TES has a negative value.

Figure 11:
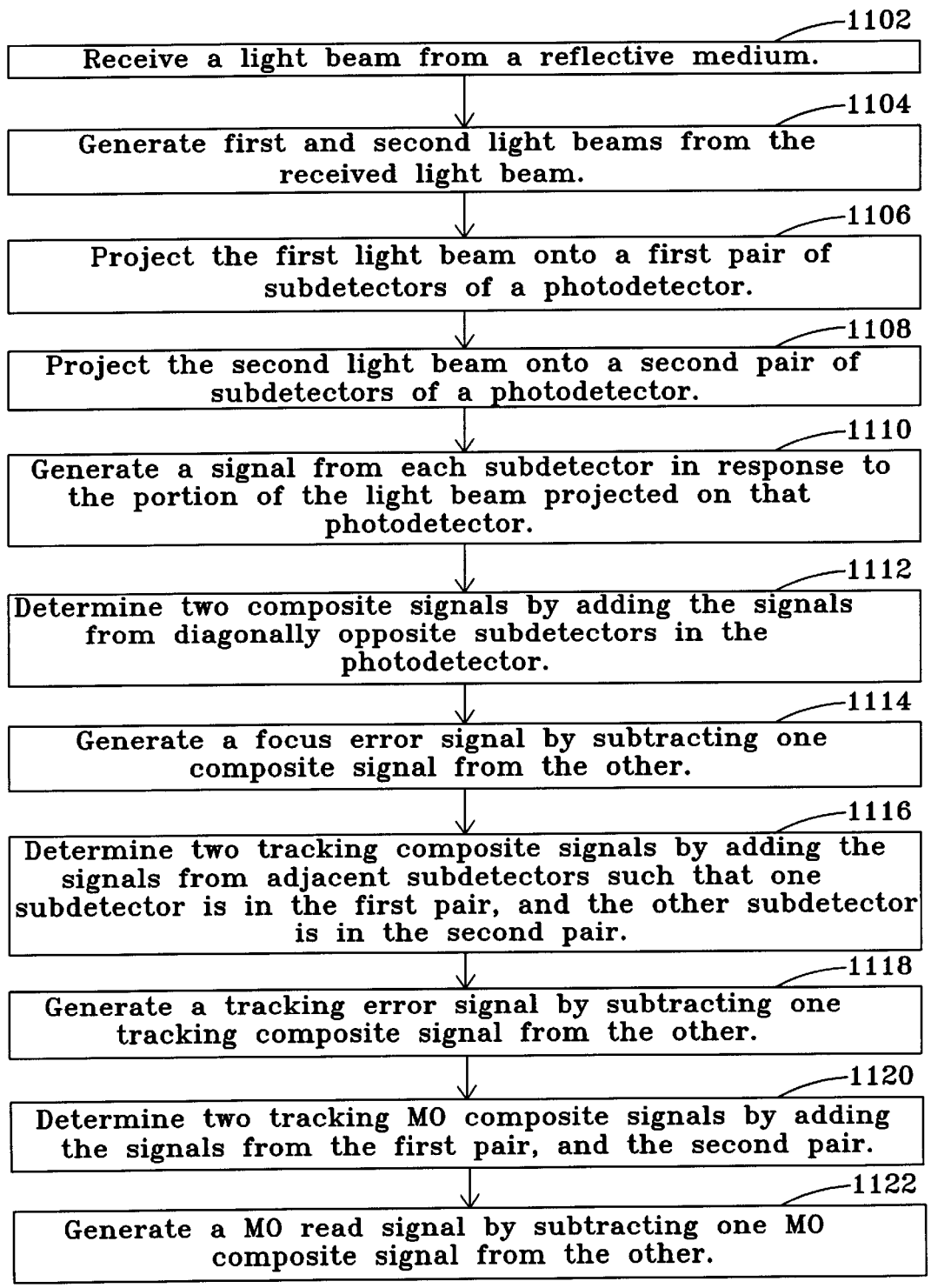
FIG. 11 is a flowchart of the method of generating the focus error signal (FES), tracking error signal (TES), magneto-optical data signal (MODS) and reflectivity data signal (RDS) of the present invention.

In FIG. 11, a method for generating the focus error signal, tracking error signal, and magneto-optical (MO) read signal is shown. In step 1102, a light beam is received from the reflective medium such as a disk. In step 1104, a prism generates first and second light beams from the received light beam, as described above. In step 1106, the prism projects the first light beam onto a first pair of subdetectors on a photodetector. In step 1108, the prism projects the second light beam onto a second pair of subdetectors on the photodetector. Steps 1106 and 1108 are substantially simultaneous. In step 1110, each subdetector of the photodetector generates a signal in response to the portion of the light beam projected on that subdetector.

Steps 1112 and 1114 generate the focus error signal. In step 1112, two composite signals are determined by adding the signals from diagonally opposite subdetectors in the photodetector. In step 1114, the focus error signal is generated by subtracting one composite signal from the other, as described above. The focus error signal has a non-zero value.

Steps 1116 and 1118 generate the tracking error signal. In step 1116, two tracking composite signals are determined by adding the signals from adjacent subdetectors such that one subdetector is in the first pair and the other subdetector is in the second pair. In step 1118, a tracking error signal is generated by subtracting one of the tracking composite signals from the other, as described above.

Steps 1120 and 1122 generate the MO read signal. In step 1118, two magneto-optical composite signals are determined by adding signals from the subdetectors of the first pair and the second pair, respectively. In step 1122, the magneto-optical read signal is generated subtracting one of the magneto-optical composite signals from the other magneto-optical composite signal, as described above.

A key advantage to using the present invention is that the number of photodetectors and corresponding optical element and circuity is reduced, thereby reducing system complexity.

Other features and advantages of the present invention will become apparent to a person of skill in the art who studies the present invention disclosure. Therefore, the scope of the present invention is to be limited only by the following claims.

What is claimed is:

1. Apparatus for determining the focus of a light beam from a reflective medium having at least one or more track, comprising:

a prism for receiving the light beam and outputting optical beams; and a photodetector having subdetectors, two adjacent subdetectors forming a first pair, the other two adjacent subdetectors forming a second pair, wherein the prism projects the optical beams onto the photodetector such that one of the optical beams is projected on at least one subdetector of the first pair of the subdetectors, and another of the optical beams is projected on at least one subdetector of the second pair of the subdetectors, wherein the amount of light projected on the subdetectors indicates the focus of the light beam with respect to the reflective medium, the subdetectors are arranged in quadrants, the quadrants being aligned with an on-track axis and a cross-track axis, wherein the optical beams from the prism are substantially vertically aligned along a beam axis, wherein the beam axis of the prism is rotated with respect to the on-track axis and the position of the light beam with respect to at least one of the tracks, one of subdetectors of each pair receives more light than the other subdetector of that pair when in focus, one of the optical beams is projected asymmetrically onto the subdetectors of the first pair of subdetectors, and the other optical beam is projected asymmetrically onto the subdetectors of the second pair of subdetectors, and the apparatus further including a summary block recovering the output of the photodetectors and generating an FES signal, a TES signal and an RDS signal.

2. The apparatus as claimed in claim 1 wherein the optical beam is projected over a larger portion of the surface of one of the subdetectors than the other subdetector of each pair of subdetectors when in focus.

3. The apparatus as claimed in claim 1 wherein the amount of light from the optical beams projected on the subdetectors indicates a polarization state of the light beam from the reflective medium.

4. The apparatus of claim 1 wherein the prism separates the light beam into two optical beams according to the polarization state of the received light beam.

5. The apparatus as claimed in claim 1 wherein the prism is a Wollaston prism.

6. The apparatus as claimed in claim 1 wherein the prism is a Rochon prism.

7. The apparatus as claimed in claim 1 wherein the prism projects the optical beams onto both subdetectors of the first and second pairs of subdetectors substantially simultaneously.

8. The apparatus as claimed in claim 1 wherein all subdetectors of the first and second pairs of subdetectors receive a portion of the respective optical beam.

9. The apparatus as claimed in claim 1 wherein the photodetector has a horizontal axis aligned with a cross track direction, the first pair of subdetectors are on one side of the horizontal axis, the second pair of subdetectors are on the other side of the horizontal axis, one subdetector from each pair of subdetectors being arranged to receive a larger portion of the respective optical beam when in focus.

10. The apparatus as claimed in claim 1 wherein the photodetector has four substantially rectangular subdetectors, the first pair of subdetectors being on one side of a horizontal axis aligned to a cross-track direction, the second pair of subdetectors being on the other side of the horizontal axis, each subdetector being adjacent the horizontal axis, one subdetector of each pair of subdetectors extending along the horizontal axis for a greater distance than the other subdetector of that pair.

11. Apparatus for determining the focus of a light beam from a reflective medium having at least one or more track, comprising:

a prism for receiving the light beam and outputting optical beams; and a photodetector having subdetectors, two adjacent subdetectors forming a first pair, the other two adjacent subdetectors forming a second pair, wherein the prism projects the optical beams onto the photodetector such that one of the optical beams is projected on at least one subdetector of the first pair of the subdetectors, and another of the optical beams is projected on at least one subdetector of the second pair of the subdetectors, wherein the amount of light projected on the subdetectors indicates the focus of the light beam with respect to the reflective medium, the subdetectors are arranged in quadrants, the quadrants being aligned along a vertical axis and a horizontal axis, the optical beams from the prism are substantially aligned with an on-track axis, wherein the vertical axis of the photodetector is rotated with respect to the on-track axis of the prism and the position of the light beam with respect to at least one of the tracks, one of subdetectors of each pair receives more light than the other subdetector of that pair when in focus, one of the optical beams is projected asymmetrically onto the subdetectors of the first pair of subdetectors, and the other optical beam is projected asymmetrically onto the subdetectors of the second pair of subdetectors, and the apparatus further including a summary block recovering the output of the photodetectors and generating an FES signal, a TES signal and an RDS signal.

12. The apparatus as claimed in claim 11 wherein the optical beam is projected over a larger portion of the surface of one of the subdetectors than the other subdetector of each pair of subdetectors when in focus.

13. The apparatus as claimed in claim 11 wherein the amount of light from the optical beams projected on the subdetectors indicates a polarization state of the light beam from the reflective medium.

14. The apparatus as claimed in claim 11 wherein the reflective medium has at least one track, and the amount of light projected on the subdetectors indicates the position of the light beam with respect to one of the at least one track of the reflective medium.

15. The apparatus of claim 11 wherein the prism separates the light beam into two optical beams according to the polarization state of the received light beam.

16. The apparatus as claimed in claim 11 wherein the photodetector has a horizontal axis aligned with a cross track direction, the first pair of subdetectors are on one side of the horizontal axis, the second pair of subdetectors are on the other side of the horizontal axis, one subdetector from each pair of subdetectors being arranged to receive a larger portion of the respective optical beam when in focus.

17. The apparatus as claimed in claim 11 wherein the photodetector has four substantially rectangular subdetectors, the first pair of subdetectors being on one side of a horizontal axis aligned to a cross-track direction, the second pair of subdetectors being on the other side of the horizontal axis, each subdetector being adjacent the horizontal axis, one subdetector of each pair of subdetectors extending along the horizontal axis for a greater distance than the other subdetector of that pair.

18. The apparatus as claimed in claim 11 wherein the prism projects the optical beams onto both subdetectors of the first and second pairs of subdetectors substantially simultaneously.

19. The apparatus as claimed in claim 11 wherein all subdetectors of the first and second pairs of subdetectors receive a portion of the respective optical beam.

* * * * *

UNITED STATES PATENT AND TRADEMARK OFFICE
CERTIFICATE OF CORRECTION

PATENT NO.   : 6,407,966 B1
DATED        : June 18, 2002
INVENTOR(S)  : Gage et al.

It is certified that error appears in the above-identified patent and that said Letters Patent is hereby corrected as shown below:

<u>Title page,</u>
Item [73], Assignee, the assignee information should be changed from:
"Seagate Technology LLP, Scotts Valley, CA (US)" to
-- Seagate Technology LLC, Scotts Valley, CA (US) --

Signed and Sealed this

Sixteenth Day of September, 2003

JAMES E. ROGAN
*Director of the United States Patent and Trademark Office*